May 20, 1924.
H. W. KLINGENSMITH
VEHICLE WHEEL
Original Filed Sept. 20, 1922
1,494,919
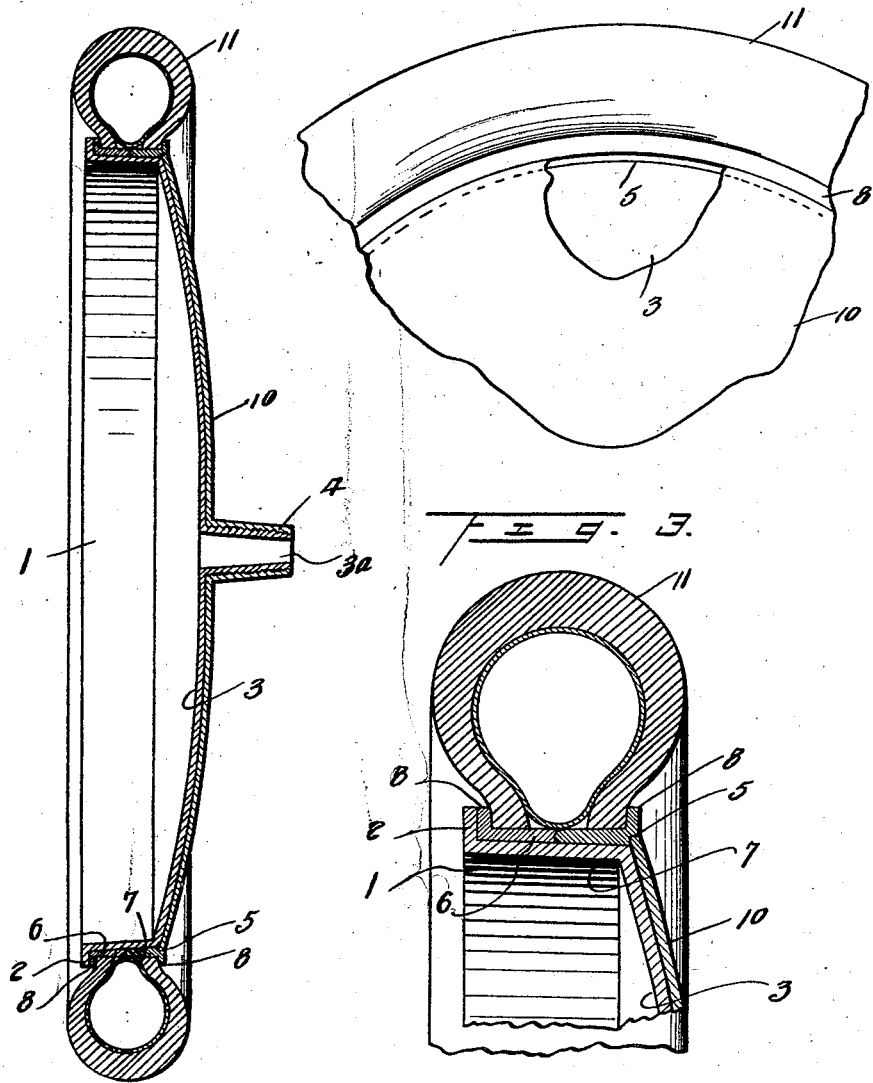

Patented May 20, 1924.

1,494,919

UNITED STATES PATENT OFFICE.

HARVEY W. KLINGENSMITH, OF REYNOLDSVILLE, PENNSYLVANIA.

VEHICLE WHEEL.

Original application filed September 20, 1922, Serial No. 589,390. Divided and this application filed July 24, 1923. Serial No. 653,514.

*To all whom it may concern:*

Be it known that I, HARVEY W. KLINGENSMITH, a citizen of the United States, residing at Reynoldsville, in the county of Jefferson and State of Pennsylvania, have invented certain new and useful Improvements in Vehicle Wheels; and I do hereby declare the following to be a full, clear, and exact description of the invention, such as will enable others skilled in the art to which it appertains to make and use the same.

The present invention is a divisional part of that for which on the 20th day of September, 1922, I filed an application for patent in the United States, and relates more particularly to the means for securing a demountable rim to the wheel.

The invention has for its object the provision of a disk wheel having a lateral flange at its outer edge to form a felly band and having a retaining flange at the outer edge of the felly band, the latter receiving a demountable rim which is retained in place by means of a disk which is made fast at a central point to the hub of the main disk of the wheel, the construction being such as to embody a few number of parts and enable the rim to be easily and quickly mounted or dismounted as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a sectional view of a wheel embodying the invention,

Figure 2 is a detail side view of a portion of the wheel, demountable rim and tire, and Figure 3 is a detail sectional view showing the parts on a larger scale.

Corresponding and like parts are referred to in the following description and designated in the several views of the drawings by like reference characters.

The wheel embodies a felly 1 provided at its inner edge with a rim receiving flange 2, and a disk 3 from the edge of which the felly extends. The felly 1 is flared to provide an inwardly and outwardly inclined seat for the rim. The wheel disk 3 is preferably concavo-convex, but it may be plain or of any other formation in cross section, and it is provided with a hub $3^a$ which is provided on its outer side with a screw thread.

The rim is countersunk or rabbeted, as indicated at 5, and it comprises similar complemental sections 6 and 7 which are separable on a plane midway of planes touching opposite edge portions of the rim. Each section of the rim is of annular form and is provided at its outer edge with a flange 8 for retaining the tire 11 in position. The inner edge of the section 6 is formed with a half-round groove to match the inner half-round edge of the section 7, whereby to prevent the disalinement of the sections when assembled and locked. The inner side of the rim is flared or inclined to correspond with the flare of the felly 1 so as to engage the same by a wedging action. The outer side of the rim is straight to provide a square seat for the tire 11.

The tire carrying rim is secured in place upon the felly 1 by means of a disk 10 which in cross section conforms to the cross sectional formation of the wheel disk 3. This disk is of greater diameter than the wheel disk 3, and its projecting edge engages in the countersink or rabbet 5 of the rim. The rim securing disk 10 is secured in position upon the wheel by means of a sleeve 4 formed thereon and threaded to engage the threads of the hub $3^a$. When in place the rim retaining disk 10 contacts with the wheel disk 3, and owing thereto it adds strength and durability to the wheel. The rim retaining disk 10 assists in sustaining the load placed upon the wheel, and it reinforces and strengthens the wheel hub $3^a$.

To mount a tire upon the rim, the section 6 is placed upon a flat surface and the tire is slipped thereon, after which the section 7 is placed in position within the tire and the rim with the tire thereon is slipped upon the felly of the wheel and is made secure by placing the disk 10 in position by tightening the same at the hub by means of the screw joint. The rim engages the felly by a wedging action.

What is claimed is:

1. A wheel having its felly flared, a demountable rim having its inner side correspondingly flared to match the felly and having its outer edge rabbeted, and a disk having its outer edge portion projecting beyond the felly and engaging the rabbeted edge of the rim.

2. A wheel comprising a disk having a lateral flange at its outer edge to form a felly and having a retaining flange at the outer edge of the felly, a demountable rim mounted upon said felly, a disk placed against the main disk of the wheel and having its outer edge portion projecting beyond the felly to engage the rim which is confined between the flange of the felly and the projecting edge of the second mentioned disk, and means securing the two disks at a central point.

3. In combination, a disk wheel including a main disk, a rim removably mounted upon the wheel, a reinforcing disk secured to the wheel and engaging the outer surface of the main disk thereof to reinforce the same, and said reinforcing disk engaging the rim to secure the latter in place.

4. In combination, a disk wheel, a rim mounted thereon and provided with a rabbet, a disk adapted to be applied to the disk of the wheel and engaged in said rabbet to secure the rim in place, and means by which the rim retaining disk may be secured in place.

In testimony whereof I affix my signature in presence of two witnesses.

HARVEY W. KLINGENSMITH.

Witnesses:
PERRY B. LOVE,
S. M. MCCREIGHT.